(12) United States Patent
Brewton et al.

(10) Patent No.: US 7,873,500 B1
(45) Date of Patent: Jan. 18, 2011

(54) TWO-WAY CONNECTION IN A GRAPHICAL MODEL

(75) Inventors: Nathan E. Brewton, Wayland, MA (US); Andrew Grace, Sherborn, MA (US); Malay Kumar, Shirley, MA (US); David Sampson, Cambridge (GB); Jeff Wendlandt, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 971 days.

(21) Appl. No.: 11/582,192

(22) Filed: Oct. 16, 2006

(51) Int. Cl.
G06G 7/48 (2006.01)
G06G 7/62 (2006.01)
G06F 9/455 (2006.01)
G06F 3/048 (2006.01)

(52) U.S. Cl. ............................... 703/6; 703/13; 703/20; 715/771

(58) Field of Classification Search ............... 703/1, 703/2, 6, 13, 20; 345/522; 717/104, 105; 715/771
See application file for complete search history.

(56) References Cited

U.S. PATENT DOCUMENTS

| 5,291,587 | A | | 3/1994 | Kodosky et al. |
|---|---|---|---|---|
| 5,301,336 | A | | 4/1994 | Kodosky et al. |
| 5,313,575 | A | | 5/1994 | Beethe |
| 6,128,589 | A | * | 10/2000 | Lilly ............................ 703/13 |
| 6,425,121 | B1 | | 7/2002 | Phillips |
| 6,701,513 | B1 | | 3/2004 | Bailey |
| 7,167,817 | B2 | | 1/2007 | Mosterman |
| 7,353,146 | B2 | | 4/2008 | Zarrinkoub et al. |
| 7,433,812 | B2 | | 10/2008 | Shakeri et al. |
| 7,503,027 | B1 | | 3/2009 | Zhao et al. |
| 2005/0160397 | A1 | * | 7/2005 | Szpak et al. ................ 717/104 |

OTHER PUBLICATIONS

Walker, "Microsoft Office Visio 2003 Inside Out", 2004, Microsoft Press, pp. 1-23.*
Bran Selic, "Using UML for Modeling Complex Real-Time Systems", 1998, Springer Berlin/Heidelberg, pp. 1-11.*
Simulink 6.3. "Using Simulink (Sep. 2005)" The MathWorks Product Manual, 711 pages.
SimDriveline for use with Simulink. (Mar. 2005) The MathWorks User's Guide, Version 1, 224 pages. See specifically sections: 1.18, 2.7-8, 2.14, 2.27, 2.78, 3.3, 3.5, 3.11, 3.13, 5.2, 5.25, 5.39, 5.42 and 5.82.
SimMechanics for use with Simulink. (Mar. 2005), The MathWorks User's Guide, Version 2, 616 pages. See specifically sections: 2.22-29, 2.53, 4.4-10, 4.24-25, 4.35, 4.43, 4.47, 9.8-13, 9.51-52 and 9.77.

* cited by examiner

*Primary Examiner*—Kakali Chaki
*Assistant Examiner*—Hung Havan
(74) *Attorney, Agent, or Firm*—Cesari and McKenna, LLP; Michael R. Reinemann

(57) ABSTRACT

A graphical modeling environment is provided for a user to build a model for physical systems using blocks connected through signals. The user may build a model with the flexibility of user-defined implementations available in the graphical modeling environment and with the architecture provided by modeling tools for modeling physical systems. A two-way connection port may be provided for adopting an architecture that supports modeling of physical systems in the graphical modeling environment. The user may use the two-way connection port to make the model built in the graphical modeling environment look architecturally like a model built using physical modeling tools.

36 Claims, 8 Drawing Sheets

TWO-WAY CONNECTION IN A GRAPHICAL MODEL

BACKGROUND

Block diagram modeling environments, such as Simulink® from The MathWorks, Inc., allow engineers to build dynamic system models using a block diagram representation. The block diagram representation can be a graphical representation of a mathematical model of the dynamic system. Simulink enables a user to build a signal-based model in which blocks in the model are connected through signals that pass between connected blocks. Simulink provides reusable components called library blocks for the creation of block diagram models. Simulink also provides a subsystem construct for integrating library blocks and/or other Simulink blocks into an encapsulated unit.

The signal-based block diagram representations may be used, in some instances, to model a control system for controlling a physical system. The physical system can be modeled using the signal-based block diagram representations or schematic-based physical modeling tools, such as SimMechanics, SimDriveline, SimHydraulics™ and SimPowerSystems, all from The MathWorks, Inc. The schematic-based physical modeling tools provide schematics that show how physical components fit together to form the physical system. The connection lines in the schematics of the schematic-based physical modeling tools can represent non-directional physical connections, rather than the signal flow connections described above for the signal-based block diagram representations.

In conventional schematic-based physical modeling tools, a limited number of pre-built solutions may be provided for physical systems. Engineers may attempt to model physical systems using signal-based block diagram representations because the signal-based block diagram representations provide extensive block libraries and/or user-defined subsystems. In the block diagram representations, however, the signal flows between blocks make the block diagram model complex and difficult to read.

SUMMARY OF THE INVENTION

An exemplary embodiment provides a block diagram modeling environment in which a user can build a model for dynamic systems using blocks connected through signals. An exemplary embodiment may also provide a two-way connection line for connecting two-way connection ports in a block diagram model. The two-way connection line provides a two-way signal interface between two-way connection ports. The two-way connection port and the two-way connection line enable model architects to adopt a schematic-based model architecture to capture connections between components in a system, while providing a mechanism for the bidirectional propagation or sharing of information between connected components to allow signal-based block diagram implementation of the behavior of the components.

In an exemplary embodiment, the two-way connection port and the two-way connection line can be used to adopt a physical modeling architecture in the block diagram modeling environment. A user may use the two-way connection port and the two-way connection line to make the model built in the block diagram modeling environment look architecturally like models built using physical modeling tools. An exemplary embodiment may enable a user to build a physical model using the flexibility of user-defined implementations available in the block diagram modeling environment. An exemplary embodiment may also enable a user to build a physical model with the architecture and assembly convenience provided by physical modeling tools.

In one aspect, a computer-implemented method is provided for building a model in a block diagram modeling environment. The method may establish a two-way connection port for a first component of the model. The two-way connection port may be connected to a second component of the model using a two-way connection line. The two-way connection port writes first information to the second component and reads second information from the second component via the two-way connection line. The two-way connection port may support information that can be written by one component and second information that can be read by a second component via the two-way connection line. The read/write can be in a dataflow manner where a value is produced by one component and consumed by another component or other communication and computation schemes may apply, for example, the connection may buffer values if a value is produced before the previously produced value is read. The buffering may be in a queue such as a first-in-first-out (FIFO) queue, a last-in-first-out (LIFO) queue, a priority queue, etc. The first component may include a two-way connection block for providing the two-way connection port for the first component. The first component may also include a connection port block for enabling the two-way connection block to communicate with the two-way connection port.

In another aspect, a system is provided for building a model in a block diagram modeling environment. The system includes a two-way connection port for a first component of the model. The system also includes a two-way connection line for connecting the two-way connection port to a second component of the model. The two-way connection port writes first information to the second component and reads second information from the second component via the two-way connection line. The first component may include a two-way connection block for providing the two-way connection port for the first component. The first component may also include a connection port block for enabling the two-way connection block to communicate with the two-way connection port.

In another aspect, a medium is provided for use with a computing device holding instructions executable by the computing device. The instructions establish a two-way connection port for a first component of the model. The instructions connect the two-way connection port to a second component of the model using a two-way connection line. The two-way connection port writes first information to the second component and reads second information from the second component via the two-way connection line. The first component may include a two-way connection block for providing the two-way connection port for the first component. The first component may include a connection port block for enabling the two-way connection block to communicate with the two-way connection port.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Figure 1:
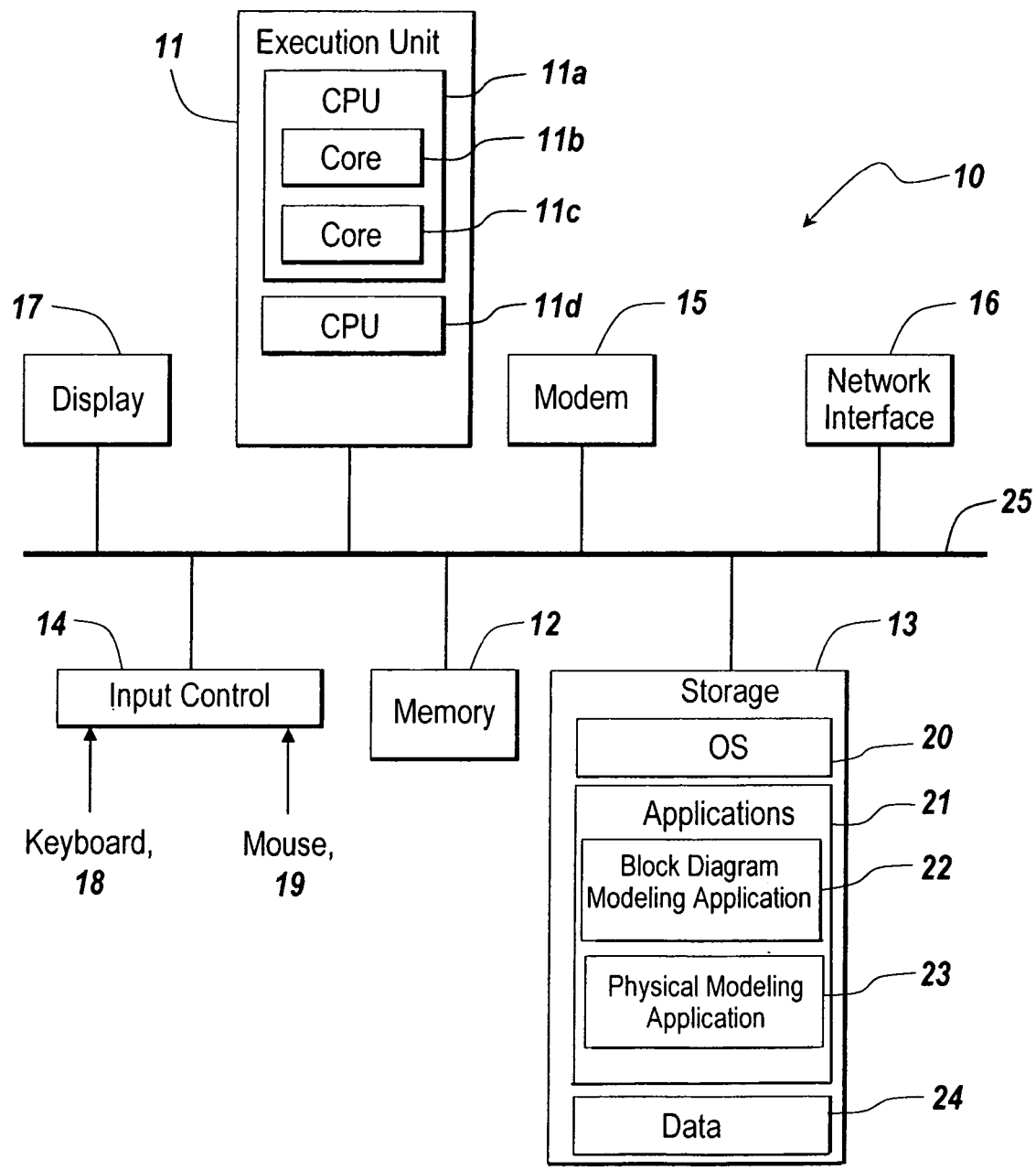
FIG. 1 is an exemplary computing device suitable for practicing an exemplary embodiment.

An exemplary embodiment may provide a block diagram modeling environment in which a user can build a block diagram model for dynamic systems using blocks connected via signals. The signals may be represented by directed lines, such as arrows. In an exemplary embodiment, the signals may also be represented by a two-way connection line between components in the block diagram model. The two-way connection line represents a connection between two components and provides a mechanism for the bidirectional propagation of information between the connected components. An exemplary embodiment may bundle two or more two-way connection lines into a single two-way connection line. For example, an embodiment may bundle two or more two-way connections lines between components in the block diagram model. An exemplary embodiment may also provide a two-way connection port for a component in the block diagram model. The two-way connection port may enable the component to be connected to another component in the block diagram model via a single two-way connection line.

A user may be able to compose interfaces to components that allow schematic-based, rather than signal-based connection of components, to form a larger system model in the block diagram model or may alter the implementations of the components without requiring changes to top-level model interface architecture using the two-way connection port and/or the two-way connection line. Implementations may allow the user to implement the components of the block diagram model in different modeling domains, such as physical modeling domains, SimMechanics, SimDriveline, SimHydraulics™, SimPowerSystems, etc., the same interfaces between components, for example, the same connection line configurations between components. In some instances, a connection of physical modeling domains and the two-way signal interface can be bundled into a single two-way connection line to simplify interfaces between components. The two-way connection line may represent propagation of information between connected components. The information may be user-specified signals, multiplexed bundles of signals, bused bundles of signals, states of connected components in a physical modeling tool, or any combination thereof. The bus can be hierarchical so that a bus can bundle not only signals but also buses and combinations of signals and buses.

In an exemplary embodiment, one information can be an entity in a discrete event simulator such as, for example, the entity flow diagram simulator SimEvents™ from The MathWorks, Inc. The second information can be an attribute that is part of the entity. An entity can have many attributes and these can all be separated on directional signal connections as information. The two way connector can then take an entity connection as input or output and read from or write to the attributes of that entity by means of signal connections.

An exemplary embodiment will be described relative to a time-based block diagram modeling environment, such as those provided by Simulink from The MathWorks, Inc. of Natick, Mass. Other embodiments are not limited to the time-based block diagram modeling environment, and may include other block diagram modeling environments. Examples of block diagram modeling environments include, but are not limited to, a discrete-event system modeling and simulation environment, such as those provided by SimEvents™ from The MathWorks, Inc., of Natick, Mass., a dataflow modeling and simulation environment, such as those provided by LabVIEW® from National Instruments Corporation of Austin, Tex., a Unified Modeling Language (UML) or SysML modeling tool such as Rhapsody® from iLogix, Inc. of Toronto, Canada or Rational® from International Business Machines Corporation of Armonk, N.Y., a differential equations based modeling tool such as provided by Dymola from Dynasim AB, Sweden or any other graphical tools that provide a signal-based modeling environment.

FIG. 1 is an exemplary computing device 10 suitable for practicing an illustrative embodiment of FIG. 1. One of ordinary skill in the art will appreciate that the computing device 10 is intended to be illustrative and not limiting of the present invention. The computing device 10 may take many forms, including but not limited to a workstation, server, network computer, quantum computer, optical computer, bio computer, Internet appliance, mobile device, pager, tablet computer, etc.

The computing device 10 may be electronic and may include an execution unit 11, a memory 12, a storage device 13, an input control 14, a modem 15, a network interface 16, a display 17, etc. The execution unit 11 may control components of the computing device 10 to provide a modeling environment. The memory 12 may temporarily store instructions or data and may provide them to the execution unit 11 so that the execution unit 11 can operate the computing device 10 and can run the modeling environment. The storage 13 may contain software tools for applications. In one implementation, storage 13 can include code for the operating system (OS) 20 of the device 10, code for applications 21 running on the operation system 20 including applications 22 for providing a block diagram modeling environment and/or applications 23 for providing a physical modeling environment, and data 24 for the models generated in the modeling environment. In other implementations, the applications can be stored in the memory 12 or they can be stored on a network device, such as a networked storage device.

Optionally, the computing device 10 may include multiple Central Processing Units (CPUs) 11a and 11d for executing software loaded in the memory 12, and other programs for controlling system hardware. Each of the CPUs 11 can include a single core or multiple cores 11b and 11c. The code loaded in the memory 12 may run in a virtualized environment, such as in a Virtual Machine (VM). Multiple VMs may be resident on a single processor. Also, part of the application could be run in hardware (H/W) 11e, for example, a graphics processing unit (GPU), digital signal processor (DSP), a field programmable gate array (FPGA) or an application specific integrated circuit (ASIC).

The input control 14 may interface with a keyboard 18, a mouse 19, and/or other input devices, such as neuro interfaces. The computing device 10 may receive through the input control 14 input data necessary for creating models, such as the selection of the attributes and operations of components in the models. For example, the user may input parameters of components via, for example, dialog boxes of the components in the models. The computing device 10 may also receive through the input control 14 input data necessary for controlling the execution of the models. Display 17 may present user interfaces to allow users to create, edit, simulate, execute, etc., the models. The resources depicted in FIG. 1 may be connected to each other through the bus 25. The bus 25 may be an on-chip, off-chip or network bus and/or may include a control-area network bus. The bus 25 may also include various other implementations, such as Peripheral Component Interconnect (PCI) and PCMCI.

Figure 2:
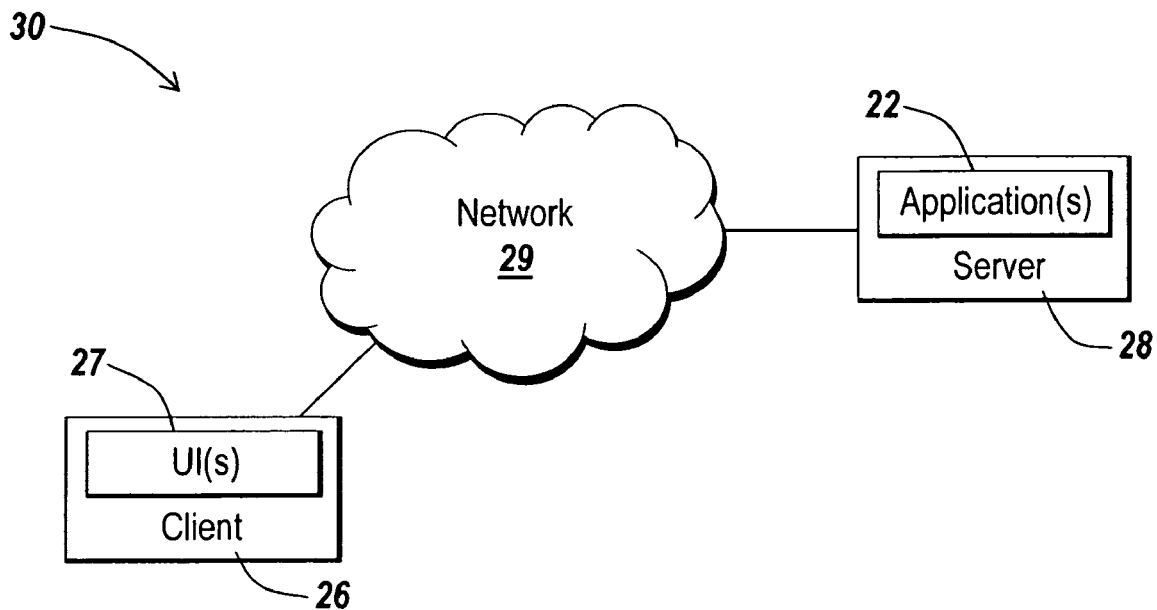
FIG. 2 depicts an exemplary network environment suitable for running a distributed implementation of an embodiment.

FIG. 2 depicts an exemplary network environment 30 suitable for implementing a distributed embodiment. The client 26 and server 28 may be coupled to the network 29 through communication links. The network interface 16 and the modem 15 (shown in FIG. 1) of the computing device 10 enable the client 26 to communicate with the server 28 through the communication network 29. The communication network 29 may include a control-area network, Internet, intranet, LAN (Local Area Network), WAN (Wide Area Network), MAN (Metropolitan Area Network), Wireless, Optical, etc. Communication facilities can support the distributed implementations of exemplary embodiments. The network interface may employ a variety of connections including, but not limited to, standard telephone lines, LAN or WAN links (e.g., 802.11, T1, T3, 56 kb, X.25), broadband connections (e.g., Integrated Services Digital Network (ISDN), Frame Relay, Asynchronous Transfer Mode (ATM)), cluster interconnection (Myrinet), Peripheral Component Interconnect (PCI), PCI Extended (PCI-X)), wireless connections, or some combination of any or all of the above.

In an illustrative embodiment, the client 26 may include user interfaces 27 for a user to create, edit, simulate, or execute a model on the client 26. The server 28 may include applications 22 for a block diagram modeling environment that enables a user to create a block diagram model. The server 28 may provide the applications 22 to the client 26 according to certain conditions, such as a license agreement. The client 26 may use the applications 22 provided from the server 28 and may create a block diagram model. The client 26 may execute the block diagram model or may send the block diagram model to the server 28 for execution. The server 28 may then return the execution results to the client 26 so that the user can determine the behavior of the block diagram model.

Figure 3:
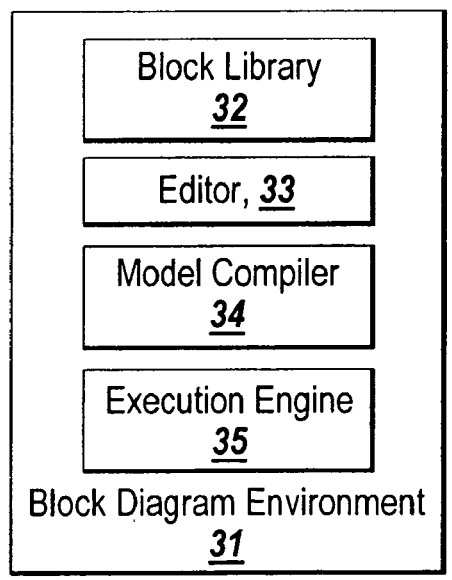
FIG. 3 depicts an exemplary block diagram modeling environment provided in an embodiment.

FIG. 3 depicts an example of the block diagram modeling environment 31 (hereinafter environment 31). Environment 31 may enable users to design a block diagram model for a dynamic system, simulate the system's behavior, analyze the performance of the system, and refine the design of the system, etc. In the block diagram modeling environment 31, users may build a block diagram model using blocks provided in the block library 32. The users may be able to customize this block library 32 to reorganize blocks in a user defined format, to delete undesired blocks, and/or to add custom blocks users have designed. The blocks may be moved via a human-machine interface, such as the mouse 19 or keyboard 18, from the block library 32 onto a window (e.g., model canvas included in an area of a display device).

The block diagram environment 31 may include a block diagram editor 33 that allows users to perform such actions as draw, edit, annotate, save, print, etc., block diagram representations of systems. The block diagram editor 33 is a graphical user interface (GUI) component that allows drafting of block diagram models by users. In the block diagram modeling environment 31, there may be a textual interface with a set of commands that allow interaction with the graphical editor. Using this textual interface, users may write special scripts that perform automatic editing operations on the block diagram.

Once a block diagram model has been constructed within the block diagram modeling environment 31, the model may be executed in the block diagram modeling environment 31. The block diagram modeling environment 31 may include a model compiler 34 that carries out the task of compiling and linking the block diagram to produce an "in-memory executable" version of the model that is used for generating code and/or simulating a block diagram model. The compile stage involves preparing data structures and evaluating parameters, configuring and propagating block characteristics, determining block connectivity, and performing block reduction and block insertion.

The block diagram modeling environment 31 may also include a block diagram execution engine 34 for executing the "in-memory executable" version of the model or the generated code for the model. Code may or may not be generated. When code is generated, the model may be simulated/executed through an accelerated simulation mode in which the block diagram model (or portions of it) are translated into either software modules or hardware descriptions (broadly termed code). When code is not generated, the block diagram model may execute in an interpretive mode in which the compiled and linked version of the block diagram model may be directly utilized to execute the model over the desired time-span. This interpretive mode of execution is suitable for getting fine-grained signal traceability. In other implementations, when users generate code, they may choose to not proceed further with the block diagram model's execution. They may choose to take the code and deploy it outside of the confines of the modeling software environment.

Figure 4:
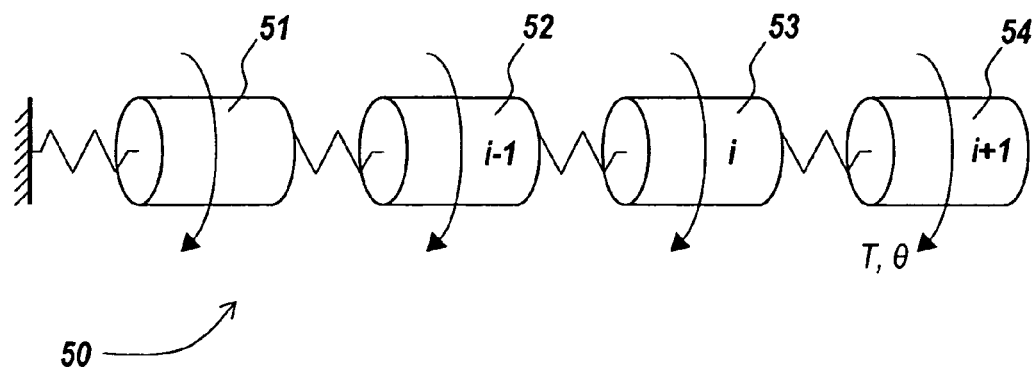
FIG. 4 depicts an exemplary physical system modeled in an embodiment.

FIG. 4 is a physical system 50 modeled in an exemplary embodiment. The physical system 50 includes a torsional chain of four bodies 51, 52, 53 and 54. The chain is grounded at one end and free at the other. External torque T may be applied to each body 51, 52, 53 or 54, and the system 50 is modeled to simulate the resulting time history of the angles of rotation θ in an exemplary embodiment of FIG. 4.

To model the system 50 in the block diagram modeling environment 31, the equations of motion of each component are determined. The equation for body i can be written as follows.

$$T_{ext,i} + K_i(\theta_i - \theta_{i-1}) + K_{i+1}(\theta_{i+1} - \theta_i) = I\ddot{\theta}_I \qquad \text{EQ. 1}$$

In EQ. 1, $\theta_i$ is the angle of rotation of body i, $K_i$ is the stiffness of the spring between body i and body i−1, $T_{ext,i}$ is the external torque acting on body i, and $T_i = K_i(\theta_i - \theta_{i-1})$ is the spring torque between body i and body i−1.

Figure 5:
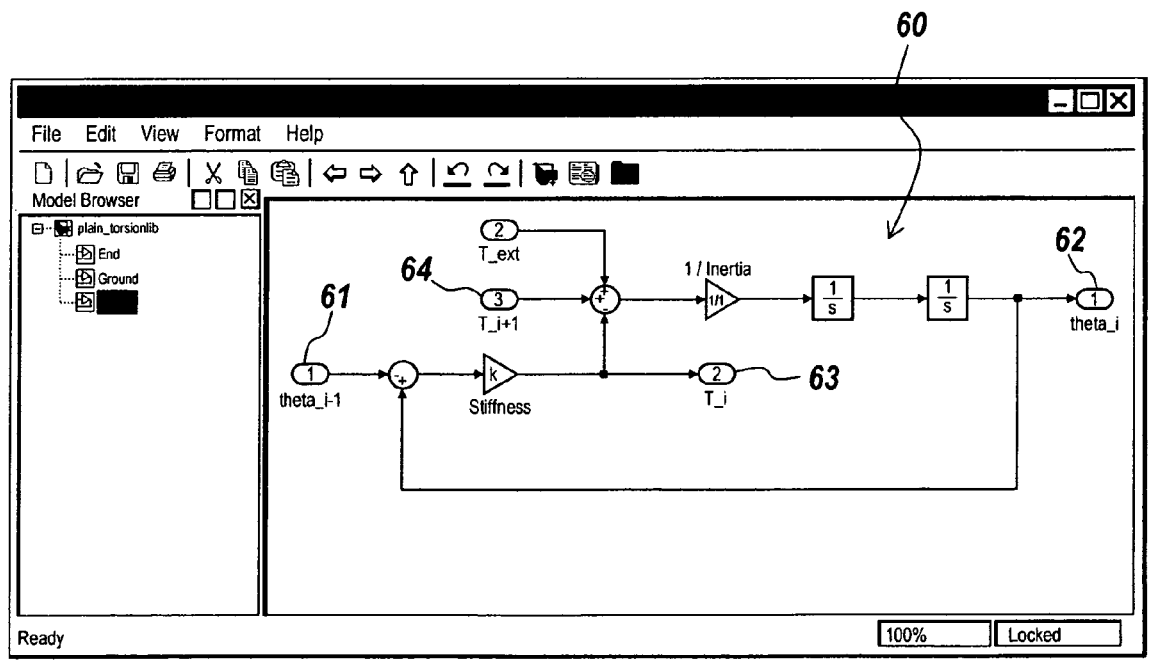
FIG. 5 depicts an exemplary implementation of equations of motion for body i in the physical system depicted in FIG. 4.

Inputs and outputs of blocks to model EQ. 1 are selected. In one implementation, an approach to solving EQ.1 may involve working backwards from the highest derivative, in this case $\ddot{\theta}_i$. An exemplary implementation of the equations of motion for body i is shown in FIG. 5. In the implementation depicted in FIG. 5, the model 60 has input signals including external torque signal T_ext, torque signal T_i+1, and angle signal theta_i−1. The model 60 has output signals including torque signal T_i and angle signal theta_i. In the model 60, the angle signals 61 and 62 (theta_i−1 and theta_i) propagate from body i−1 to body i, while torque signals 63 and 64 (T_i and T_i+1) propagate from body i+1 to body i−1 to body i.

In an exemplary embodiment, bidirectional propagation of information between each pair of adjacent components can be replaced with a single two-way connection line. For example, input torque signal T_i+1 is read by body i from body i+1, and output angle signal theta_i is written from body i to body i+1. Therefore, input torque signal T_i+1 and output angle signal theta_i between body i and body i+1 can be replaced with a single two-way connection line.

In a similar way, input angle signal theta_i−1 is read by body i from body i−1, and output torque signal T_i is written from body i to body i−1. Therefore, input angle signal theta_i−1 and output torque signal T_i between body i and body i−1 can be replaced with another single two-way connection line. With the replacement, the model architecture of the physical system 50 in a block diagram modeling environment can be the same as the model architecture of the physical system 50 that is built using physical modeling tools.

Figure 6:
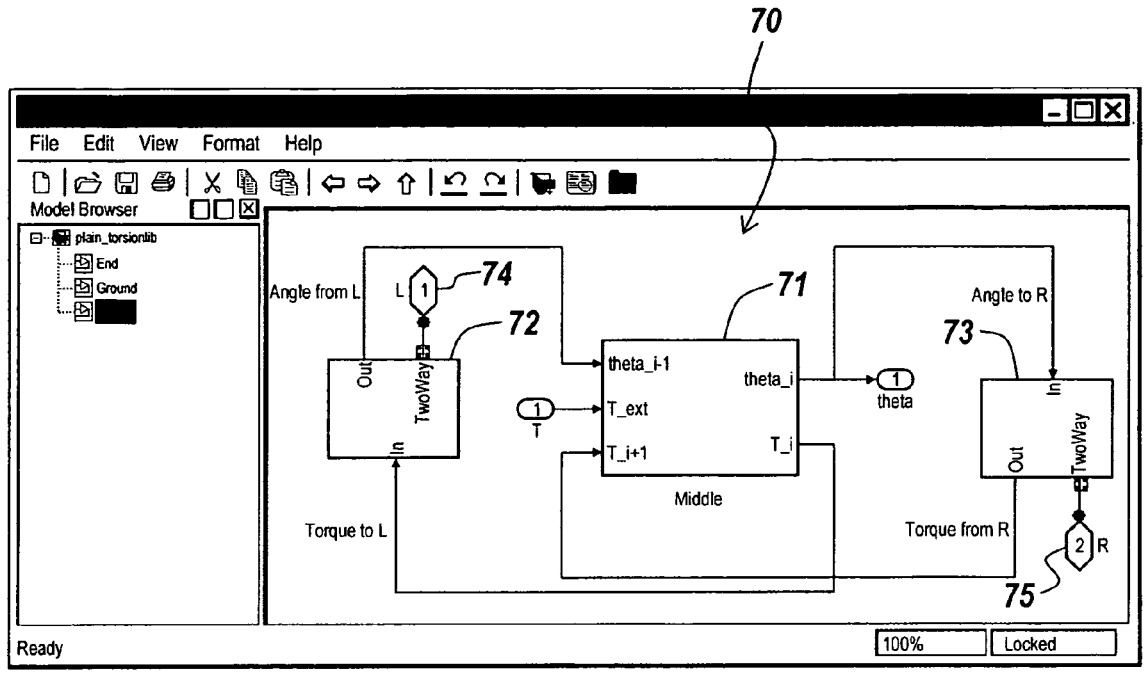
FIG. 6 shows another implementation of equations of motion for body i in the physical system depicted in FIG. 4.

FIG. 6 shows an exemplary component model 70 for body i implemented in Simulink that enables the block diagram model 60 depicted in FIG. 5 to be connected to another component via a two-way connection line. In the implementation shown in FIG. 6, the model 60 depicted in FIG. 5 is represented by a subsystem block 71. That is, the subsystem block 71 includes the same input signals and output signals as the model 60, and has the same functionality as the model 60. The subsystem block 71 may be useful to simplify the block diagram model by grouping blocks into subsystems. Therefore, subsystem block 71 can reduce the number of blocks displayed in the model window. Subsystem block 71 can also keep functionally related blocks together. In particular, the subsystem block 71 may enable the user to establish a hierarchical block diagram model in which the subsystem block is on one layer and the blocks that make up the subsystem are on another layer. Furthermore, subsystem block 71 is reusable in the same or different block diagram model.

In the implementation shown in FIG. 6, subsystem block 71 is coupled to two-way connection blocks 72 and 73. The left two-way connection block 72 enables subsystem block 71 to write torque signal T_i to, and read angle signal theta_i−1 from its neighbor body i−1 via a single connection port block 74. The right two-way connection block 73 enables subsystem block 71 to write angle signal theta_i to, and read torque signal T_i+1 from, its neighbor body i+1 via a single connection port block 75.

Figure 7:
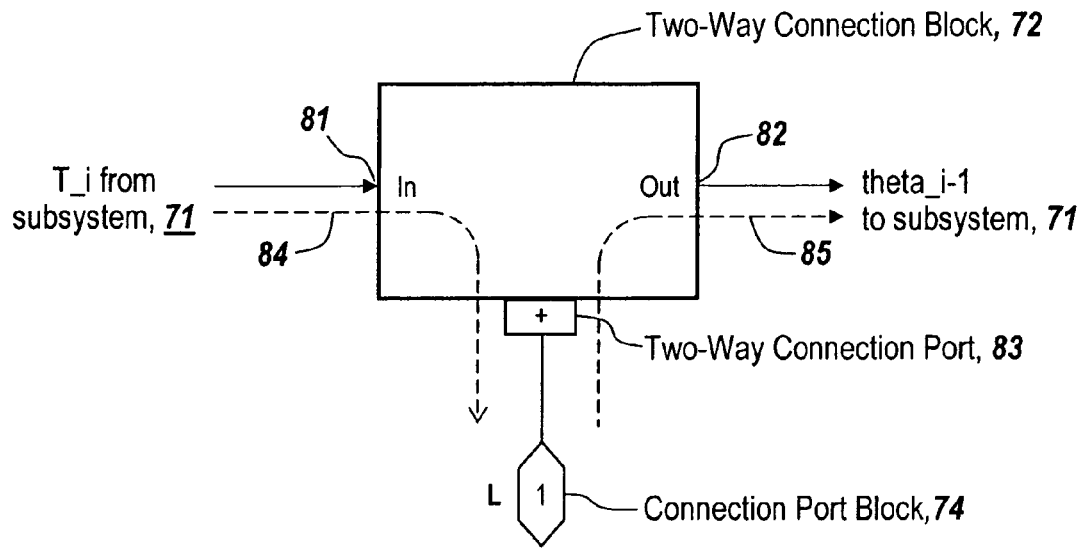
FIG. 7 depicts an exemplary two-way connection block.

FIG. 7 depicts the two-way connection block 72 in more detail. In an exemplary embodiment, the two-way connection block 72 includes three ports including input port 81, output port 82 and two-way connection port 83. The input port 81 and output port 82 are coupled to the subsystem 71, and the two-way connection port 83 may be coupled to a connection port block 74. The implementation of the connection port block 74 coupled to the two-way connection block 72 may create a two-way connection port (for example, 106 in FIG. 9) on the boundary of a subsystem block (for example, 103 in FIG. 9) that includes the connection port block 74 coupled to the two-way connection block 72. The two-way connection port created on the boundary of a subsystem block may be connected to a component or subsystem (for example, 102 in FIG. 9) representing the equations of motion for body i−1. The two-way connection port created on the boundary of a subsystem block will be described in more detail with reference to FIGS. 9 and 10.

The torque signal T_i read from the subsystem block 71 through the input port 81 is written to the two-way connection port 83, as indicated by dotted line 84. The torque signal T_i is sent to body i−1 through the two-way connection port 83. The angle signal theta_i−1 read from the body i−1 through the two-way connection port 83 is written to the output port 82, as indicated by dotted line 85. The angle signal theta_i−1 is sent to the subsystem 71 through the output port 82. Two-way connection block 73 may operate in a manner similar to two-way connection block 72.

As a result, bidirectional signals can be written and read by the two-way connection block 72. The two-way connection block 72 bundles bidirectional signals (input angle signal theta_i−1 and output torque signal T_i) into one two-way signal. In an exemplary embodiment, the two-way connection block 72 route signals using Goto and From blocks provided in Simulink. The Goto block passes its input to the two-way connection port 83. The From block accepts a signal from the two-way connection port 83, then passes it as output. The From block and the Goto block allow a signal to be routed to/from the two-way connection port 83. The Goto blocks and the From blocks are matched by the use of tags. For example, From blocks may have a parameter for identifying the tags of Goto blocks that forward signals to the two-way connection port 83. Real or complex valued signals, muxed signals and bus signals may be supported as both inputs and outputs of the two-way connection port 83. Bus signals refer to a set of signals combined into a bus. A bus may be hierarchical in that elements of a bus can be buses. The signals can be composite signals with a given structure. The usage of Goto blocks and From blocks is exemplary and other implementations of the two-way connection blocks 72 and 73 can be implemented using other techniques, such as using callback functions or internal APIs for routing signals and using connection checking functionalities, etc. In the connection checking functionalities, for example, the two-way connection block may route signals by looking at other two-way connection block connected to it. For any two-way connection block, the other partner two-way connection block connected through two-way connection ports is first identified. Then, the source and destination of its input and output signals are assigned. The destination of the signal going into its input port gets assigned to the output port of the partner two-way connection block and the source of the signal coming out from its output port gets assigned to the input port of its partner two-way connection block. So, a signal going into its input port gets routed to the block connected to the block connected to output port of partner two-way connection block and signal going into input port of its partner two-way connection block gets routed to the block connected to its output port.

Figure 8:
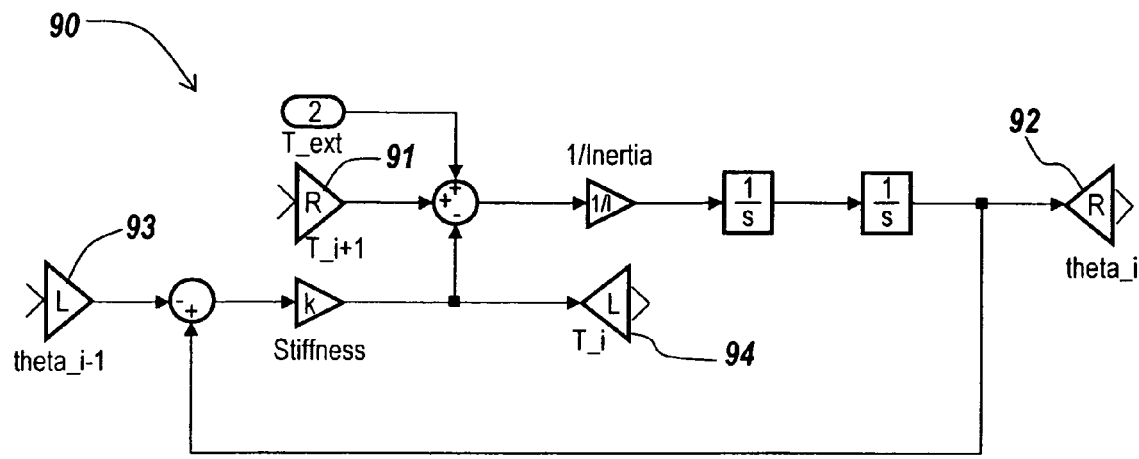
FIG. 8 shows another implementation of equations of motion for body i in the physical system depicted in FIG. 4.

FIG. 8 depicts another exemplary representation 90 for enabling the model 60 depicted in FIG. 5 to be connected to another component via a two-way connection line. In an exemplary embodiment of FIG. 8, the input and output signal port blocks 91, 92, 93 and 94 may be used as interface blocks for the signal elements in a given block diagram. The input and output signal port blocks 91, 92, 93 and 94 may be placed anywhere in the given block diagram depending on the locations of the signal elements. The input and output signal port blocks 91, 92, 93 and 94 can be assigned as the interface block, for example, by right clicking on it and changes its shape to visually confirm that it is an element of a two-way connection block. Although a two-way connection block does not appear visually in the block diagram 90, the input and output signal port blocks 91, 92, 93 and 94 are interpreted as a part of a virtual two-way connection block coupled to a connection block.

In FIG. 8, the input signal port block 91 for input signal T_i+1 and the output signal port block 92 for output signal theta_i are designated R in FIG. 8 to indicate that these blocks are bundled to represent one two-way connection block coupled to a connection block, which morphs into a two-way connection port on a subsystem block. The input signal port block 93 for input signal theta_i−1 and the output signal port block 94 for output signal T_i are designated L in FIG. 8 indicate that these blocks are bundled to represent another two-way connection block coupled to a connection block, which morphs into another two-way connection port on the same subsystem block. Although a two-way connection block is not used in the block diagram 90, the model 90 can be interpreted as the same model as depicted in FIG. 6 using the input and output signal port blocks 91, 92, 93 and 94.

Figure 9:
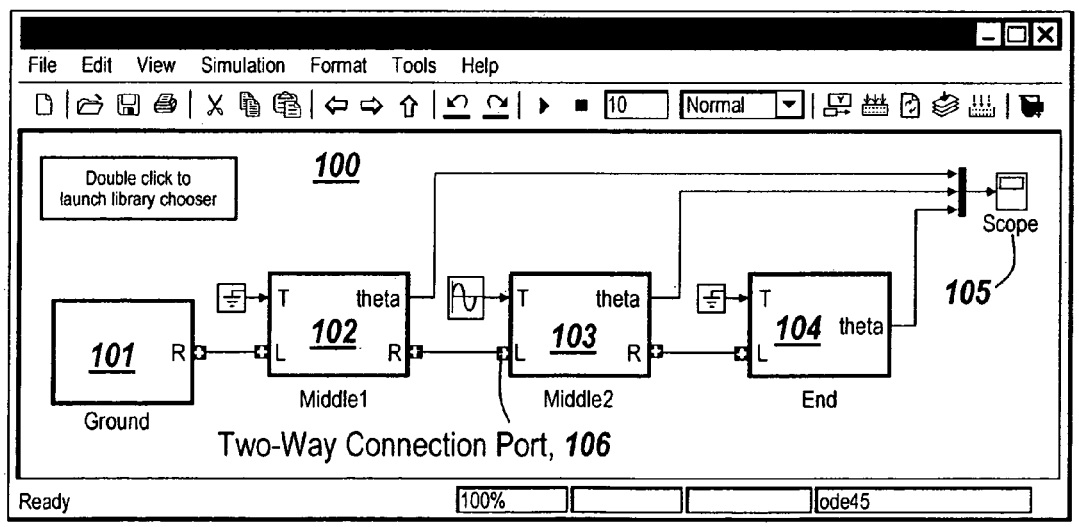
FIG. 9 shows an exemplary model for the physical system depicted in FIG. 4.

FIG. 9 depicts an exemplary system model 100 implemented for the physical system 50 (FIG. 4) using two-way connections. The model 100 may include four subsystem blocks 101, 102, 103 and 104 for representing the bodies 51, 52, 53 and 54 in the system 50. The subsystem blocks 101, 102, 103 and 104 may be implemented using the model 70. For example, the subsystem blocks 102 and 103 may include the same block diagram model 70 and represent the equations of motion for bodies 52 and 53, respectively. The Ground subsystem block 101 may represent the equations of motion for body 51 and can be obtained by removing inputs signals theta_i−1 and $T_{ext,i}$ and output signal T_i from the block diagram model 70. The end subsystem block 104 may represent the equations of motion for body 54 and can be obtained by removing input T_i+1 from the block diagram model 70. The system model 100 is excited with a sinusoidal torque applied to the subsystem 103, and the angle responses from the subsystems 102, 103 and 104 are displayed on a scope 105.

The subsystem blocks 101, 102, 103 and 104 include one or two two-way connection ports. In each subsystem, the two-way connection port is created by implementing a connection port 74 or 75 coupled to a two-way connection block within the subsystem, and positioned at the left side or the right side of the boundary of the block. In an exemplary embodiment, the two-way connection port positioned at the left side of the boundary of the block 103 is designated as L and the two-way connection port positioned at the right side of the boundary of the subsystem block 103 is designated as R. In FIG. 9, the positions of the two-way connection port 106 are illustrative and the two-way connection port 106 can be positioned at any location on the boundary of the subsystem block 103. A user may be allowed to specify the location of the two-way connection port at a subsystem block that the user has implemented.

Figure 10:
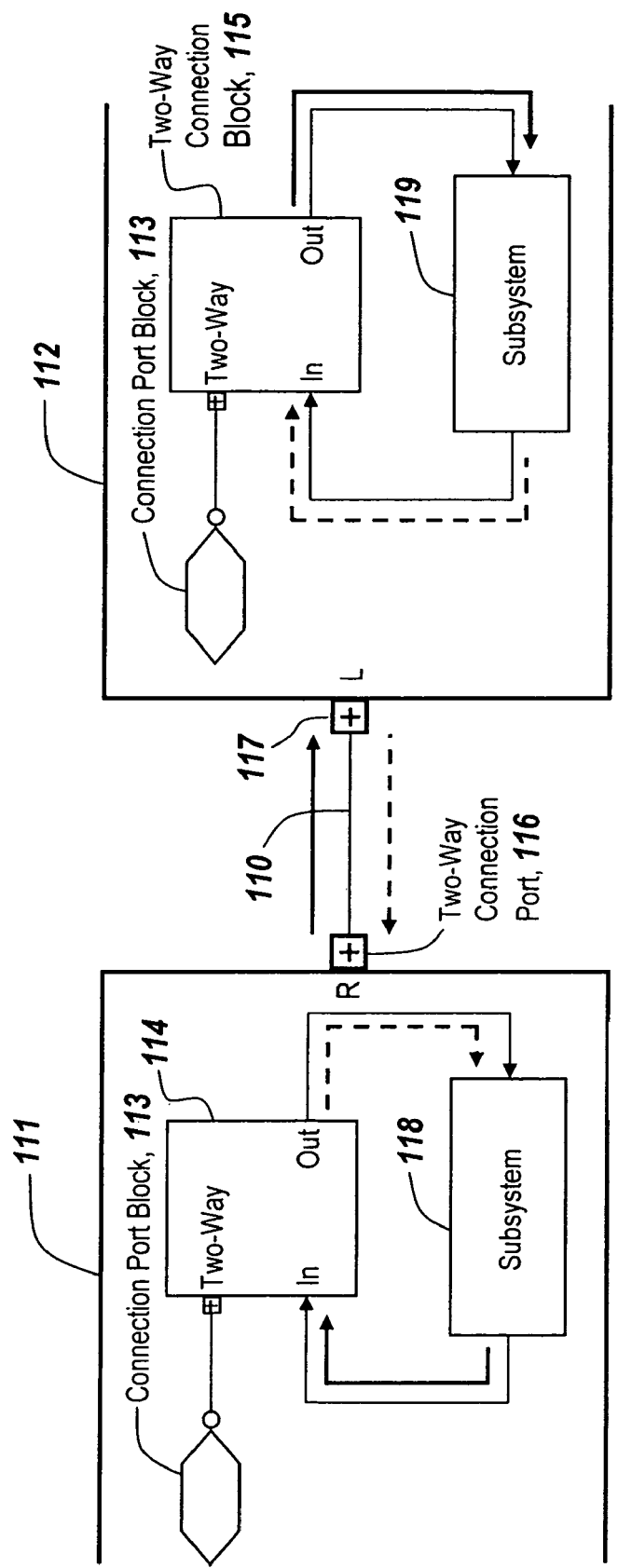
FIG. 10 depicts an exemplary two-way connection between two-way connection ports.

FIG. 10 depicts information flows between subsystem blocks in more detail. The first subsystem 111 and the second subsystem 112 include a connection port 113 coupled to two-way connection blocks 114 and 115, respectively. The implementation of the connection ports 113 coupled to two-way connection blocks 114 and 115 creates two-way connection ports 116 and 117 for the first and second subsystems 111 and 112, respectively. The two-way connection blocks 114 and 115 are linked to lower level subsystems 118 and 119 to bundle bidirectional signals read from and/or written to the subsystems 118 and 119, respectively. The two-way connection ports 116 and 117 for the first and second subsystems 111 and 112, respectively, are connected through the two-way connection line 110. The signal generated by the subsystem 118 is written to the subsystem 119 along the bold line, while the signal generated by the subsystem 119 is written to the subsystem 118 along the dotted line.

Using the two-way connection port, the two-way connection line, and two-way connection block, a user is able to build the block diagram model for a physical system that has the same architecture as a physical model built using physical modeling tools. The user is able to adopt a schematic-based model architecture to capture connections between components in a system, while providing a mechanism for the bidirectional propagation of information between connected components to allow signal-based block diagram implementation of the behavior of the components. For example, the user can implement the subsystems using different modeling tools, such as physical modeling tools.

Figure 11:
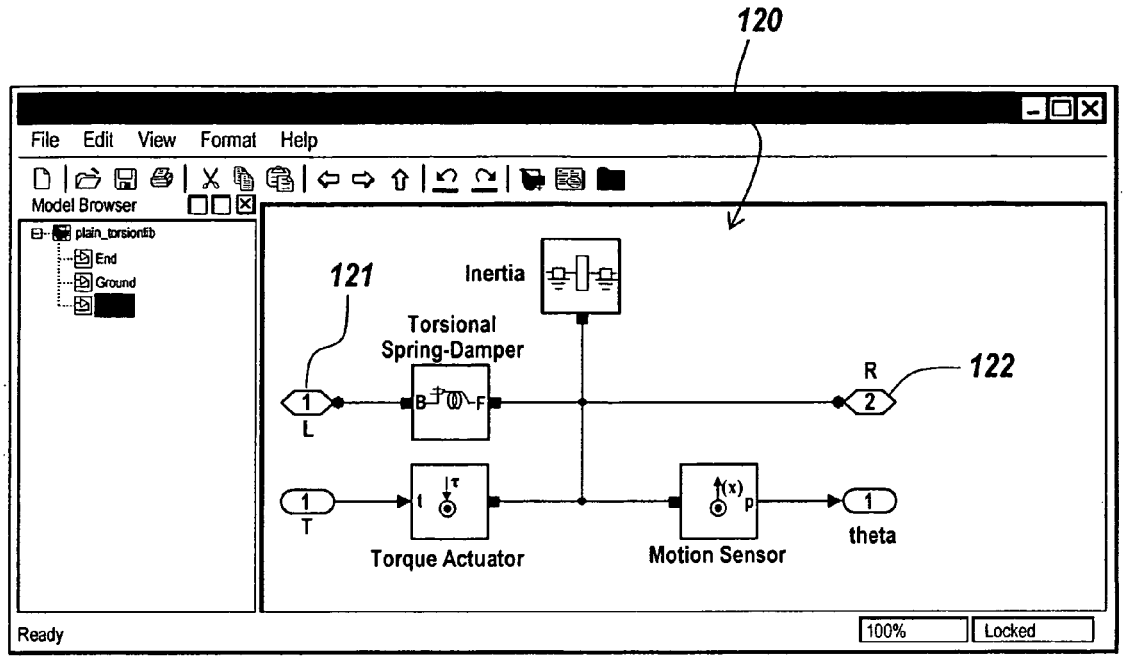
FIG. 11 shows an exemplary model for body i depicted in FIG. 4.

FIG. 11 is an exemplary implementation of body i using SimDriveline, from The MathWorks. SimDriveline is a physical modeling environment for the engineering design and simulation of drivelines, or idealized powertrain systems. The SimDriveline libraries provide blocks to represent rotating bodies, gear constraints among bodies, special dynamic elements such as spring-damper forces, rotational stops, and clutches; transmissions, and sensors and actuators. In SimDriveline, system models are built up from component blocks by connecting the component blocks in a schematic-based manner that mimics the physical connections in the system. The model 120 for body i has the same interface as the model 70 depicted in FIG. 7. The user can replace the subsystems in the model 100 with the model 120 implemented in the physical modeling tools while maintaining the interfaces in the model.

Figure 12:
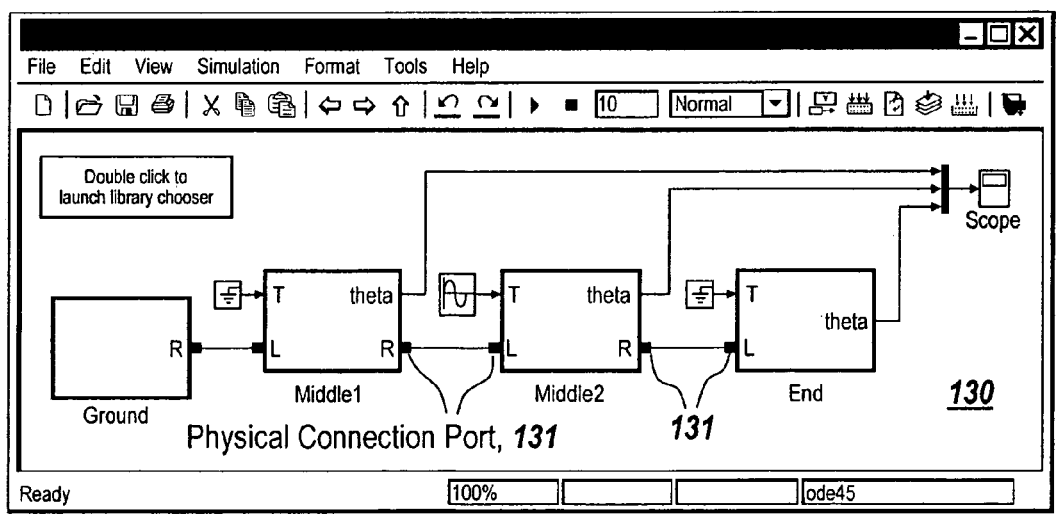
FIG. 12 depicts another exemplary model for the physical system depicted in FIG. 4.

FIG. 12 is an exemplary model 130 in which the subsystems in the model 100 are replaced using the subsystem model 120. When the subsystems of the model 100 are replaced with the model 120, the connection ports on the boundary of the subsystem block are automatically morphed to physical connection ports 131. In an exemplary embodiment, the connection port of a subsystem block in the block diagram modeling environment may be morphed into a physical connection port 131 based on the implementation of the subsystem. In the model 120 depicted in FIG. 11, connection ports 121 and 122 are coupled to the physical model blocks. The implementation of physical model blocks coupled to a connection port 121 or 122 within a subsystem morphs the connection port into physical connection ports. The physical connection ports are connected through physical connection lines that represent physical connections and do not carry signals. The subsystem connection ports and their corresponding connection port blocks are compatible with numerous connection types, including two-way connection lines, SimDriveline physical connection lines, etc. When subsystems of the model are replaced with subsystems implemented in different modeling domains, the interconnections or connection interfaces between the components of the model remains valid.

Figure 13:
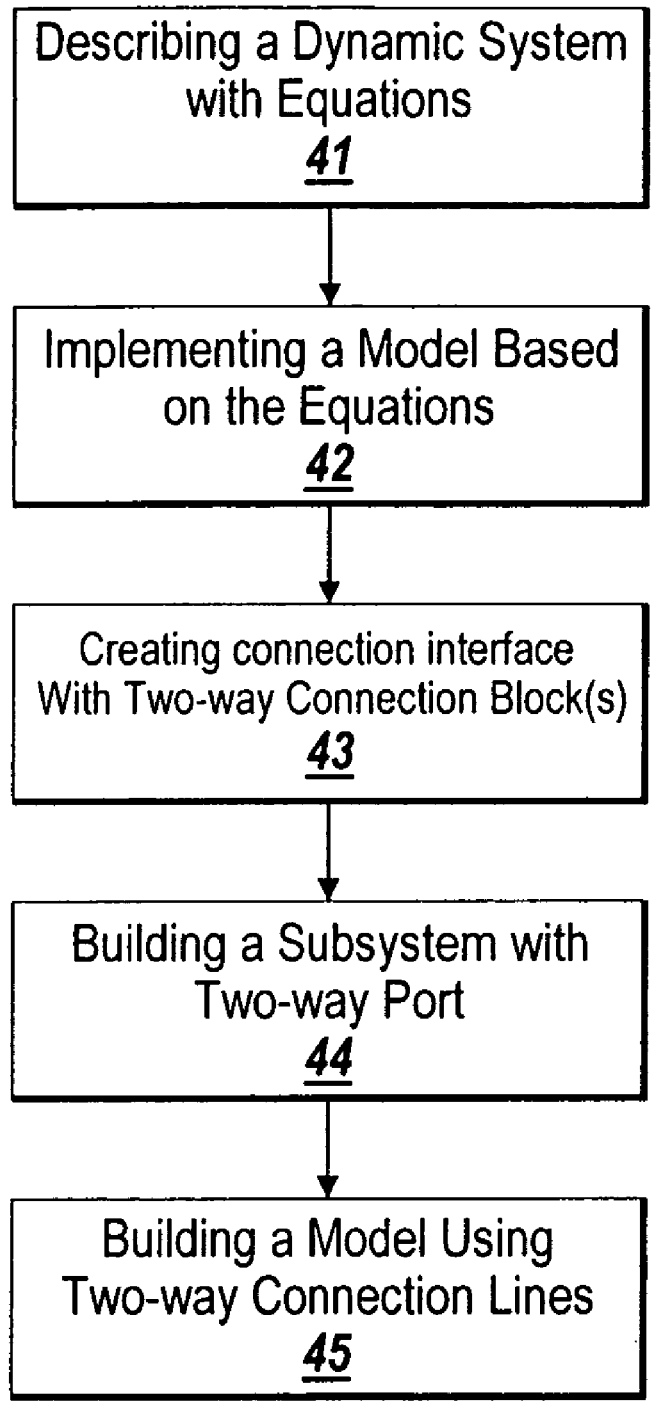
FIG. 13 shows exemplary processing for an embodiment.

FIG. 13 is a flow chart showing exemplary processing for modeling a physical system in a block diagram modeling environment 31. To model the system 50 in the block diagram modeling environment 31, physical connected components, such as bodies 51-54, are determined in the system 50. Equations of motion for each component are determined, for example, the equation for body i described above in EQ. 1 (step 41). Based on the equation, inputs and outputs of each component are selected to determine connection interfaces between the components in a model (step 42). One or more two-way connection blocks are connected to a component model to create one or more two-way connection interfaces with other components in the model (step 43). An exemplary two way connection block is described above with reference to FIG. 7. The two-way connection interfaces enables bidirectional propagation of information between the component and other components in the model. The component model with one or more two-way connection blocks can be encapsulated in a subsystem block to simplify the block diagram model (step 44). On the boundary of the subsystem block, one or more two-way ports are created for the two-way blocks encapsulated within the subsystem block to communicate with other components or subsystem blocks in the model, The two-way connection port of the subsystem block may be connected to the two-way connection port of another subsystem block in the model 70 via a two-way connection line (step 45). The two way connection line represents bidirectional propagation of information between the connected subsystem blocks.

Since changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A method performed by a computer for building a model in a graphical modeling environment, the method comprising:
   building a sub-model in the graphical modeling environment at a first hierarchical level, the sub-model including a two-way connection block and a two-way connection port block,
      the two-way connection block having
         a unidirectional input port,
         a unidirectional output port, and
         a two-way connection port,
      the unidirectional input port and the unidirectional output port being configured for connection to one or more one or more functional blocks of the sub-model, and
      the two-way connection port of the two-way connection block being coupled to the two-way connection port block;
   is establishing a first subsystem in the graphical modeling environment at a second hierarchical level, the first subsystem representing the sub-model;
   representing at least the two-way connection port block of the sub-model at the first hierarchical level as a two-way connection port of the first subsystem in the graphical modeling environment at the second hierarchical level; and
   connecting, in the graphical modeling environment at the second hierarchical level, the two-way connection port of the first subsystem to a two-way connection port of a second subsystem through a two-way connection line, the two-way connection port of the first subsystem writing a first information to the second subsystem and reading a second information from the second subsystem via the two-way connection line.

2. The method of claim 1, wherein the graphical modeling environment is a time-based block diagram modeling environment.

3. The method of claim 1, wherein the two-way connection line is a non-directed connection.

4. The method of claim 1, wherein the first information is an entity in a discrete event simulator and the second information is an attribute that is part of the entity.

5. The method of claim 1, wherein the first subsystem provides a hierarchical view of the model.

6. The method of claim 1, wherein the two-way connection port of the first subsystem provides a morphable interface between the first subsystem and the second subsystem depending on an implementation of the first subsystem.

7. The method of claim 1, further comprising:
   representing the two-way connection block of the sub-model at the first hierarchical level as the two-way connection port on the first subsystem.

8. The method of claim 1, wherein at least one of the first and second information comprises a muxed signal or a bus signal.

9. The method of claim 1, wherein the two-way connection port of the first subsystem is positioned at a user-defined location with respect to the first subsystem.

10. The method of claim 1, further comprising:
    enabling a user to implement the first subsystem across multiple modeling domains with a same interface between the first subsystem and the second subsystem.

11. The method of claim 10, wherein the multiple modeling domains comprise a physical modeling domain.

12. The method of claim 11, wherein the two-way connection port and the two-way connection line, in the graphical modeling environment at the second hierarchical level, are automatically changed to a physical connection port and a physical connection line defined in the physical modeling domain.

13. A system for building a model in a graphical modeling environment, the system comprising:
    processing logic configured to provide:
       a sub-model in the graphical modeling environment at a first hierarchical level, the sub-model having a two-way connection block and a two-way connection port block,
          the two-way connection block having a unidirectional input port, a unidirectional output port, and a two-way connection port,
          the unidirectional input port and the unidirectional output port being configured to connect to one or more functional blocks of the sub-model, and
          the two-way connection port of the two-way connection block being coupled to the two-way connection port block;
       a first subsystem in the graphical modeling environment at a second is hierarchical level to represent the sub-model;
       a two-way connection block connection port of the first subsystem in the graphical modeling environment at the second hierarchical level to represent the two-way connection port block of the sub-model at the first hierarchical level; and
       a two-way connection line for connecting, in the graphical modeling environment at the second hierarchical level, the two-way connection port of the first subsystem to a two-way connection port of a second subsystem, the two-way connection port of the first subsystem writing a first information to the second subsystem and reading a second information from the second subsystem via the two-way connection line; and
    a memory coupled to the processing logic for storing the first and second information.

14. The system of claim 13, wherein the graphical modeling environment comprises a time-based block diagram modeling environment.

15. The system of claim 13, wherein the two-way connection line is a non-directed connection.

16. The system of claim 13, wherein the first information is an entity in a discrete event simulator and the second information is an attribute that is part of the entity.

17. The system of claim 13, wherein the first subsystem provides a hierarchical view of the model.

18. The system of claim 13, wherein the two-way connection port of the first subsystem provides a morphable interface between the first subsystem and the second subsystem depending on an implementation of the first subsystem.

19. The system of claim 13, further comprising:
representing the two-way connection block of the sub-model at the first hierarchical level as the two-way connection port on the first subsystem.

20. The system of claim 13, wherein at least one of the first and second information comprises a muxed signal or a bus signal.

21. The system of claim 13, wherein the two-way connection port of the first subsystem is positioned at a user-defined location with respect to the first subsystem.

22. The system of claim 13, wherein the first subsystem is implemented across multiple modeling domains with a same interface between the first subsystem and the second subsystem.

23. The system of claim 22, wherein the multiple modeling domains comprise a physical modeling domain.

24. The system of claim 23, wherein the two-way connection port and the two-way connection line, in the graphical modeling environment at the second hierarchical level, are automatically changed to a physical connection port and a physical connection line defined in the physical modeling domain.

25. A memory medium holding instructions executable in a computing device for building a model in a graphical modeling environment, the instructions comprising:
instructions for building a sub-model in the graphical modeling environment at a first hierarchical level, the sub-model including a two-way connection block and a two-way connection port block,
the two-way connection block having
a unidirectional input port,
a unidirectional output port, and
a two-way connection port,
the unidirectional input port and the unidirectional output port being configured for connection to one or more functional blocks of the sub-model, and
the two-way connection port of the two-way connection block being coupled to the two-way connection port block;
instructions for establishing a first subsystem in the graphical modeling environment at a second hierarchical level, the first subsystem representing the sub-model;
instructions for representing at least the two-way connection port block of the sub-model at the first hierarchical level as a two-way connection port of the first subsystem in the graphical modeling environment at the second hierarchical level; and
instructions for connecting, in the graphical modeling environment, the two-way connection port of the first subsystem to a two-way connection port of a second subsystem using a two-way connection line, the two-way connection port of the first subsystem writing a first information to the second subsystem and reading a second information from the second subsystem via the two-way connection line.

26. The medium of claim 25, wherein the graphical modeling environment comprises a time-based block diagram modeling environment.

27. The medium of claim 25, wherein the two-way connection line is a non-directed connection.

28. The medium of claim 25, wherein the first information is an entity in a discrete event simulator and the second information is an attribute that is part of the entity.

29. The medium of claim 25, wherein the first subsystem provides a hierarchical view of the model.

30. The medium of claim 25, wherein the two-way connection port of the first subsystem provides a morphable interface between the first subsystem and the second subsystem depending on an implementation of the first subsystem.

31. The medium of claim 25, further comprising:
representing the two-way connection block of the sub-model at the first hierarchical level as the two-way connection port on the first subsystem.

32. The medium of claim 25, wherein at least one of the first and second information comprises a muxed signal or a bus signal.

33. The medium of claim 25, wherein the two-way connection port of the first subsystem is positioned at a user-defined location with respect to the first system.

34. The medium of claim 25, further comprising:
instructions for enabling a user to implement the first subsystem across multiple modeling domains with a same interface between the first subsystem and the second subsystem.

35. The medium of claim 34, wherein the multiple modeling domains comprise a physical modeling domain.

36. The medium of claim 35, wherein the two-way connection port and the two-way connection line, in the graphical modeling environment of the second hierarchical level, are automatically changed to a physical connection port and a physical connection line defined in the physical modeling domain.

* * * * *

UNITED STATES PATENT AND TRADEMARK OFFICE
CERTIFICATE OF CORRECTION

PATENT NO. : 7,873,500 B1  Page 1 of 1
APPLICATION NO. : 11/582192
DATED : January 18, 2011
INVENTOR(S) : Nathan E. Brewton It is certified that error appears in the above-identified patent and that said Letters Patent is hereby corrected as shown below:

Col. 12, line 40 should read: "at a second ~~is~~ hierarchical level to represent the sub-"

Signed and Sealed this
Twelfth Day of June, 2012

David J. Kappos
*Director of the United States Patent and Trademark Office*